United States Patent [19]
Zak

[11] Patent Number: 6,074,266
[45] Date of Patent: Jun. 13, 2000

[54] SPIN POP WITH FACIAL EXPRESSION CAPABILITY

[75] Inventor: Marc Zak, Sonoma, Calif.

[73] Assignee: Oddzon, Inc., Pawtucket, R.I.

[21] Appl. No.: 09/243,894

[22] Filed: Feb. 3, 1999

[51] Int. Cl.[7] .......................... A63H 33/00; A63H 33/26; A63H 13/00
[52] U.S. Cl. .............................. 446/73; 446/236; 446/337
[58] Field of Search .............................. 426/104; 446/72, 446/73, 236, 337, 395, 484

[56] References Cited

U.S. PATENT DOCUMENTS

| | | | |
|---|---|---|---|
| 396,252 | 1/1889 | Beidler | 40/540 |
| 2,001,334 | 5/1935 | Stein | 446/384 |
| 2,733,547 | 2/1956 | Cohn | 446/391 |
| 4,279,419 | 7/1981 | Barnes et al. | 273/108.22 |
| 4,580,992 | 4/1986 | McKay | 446/321 |
| 5,209,692 | 5/1993 | Coleman et al. | 446/71 |
| 5,324,527 | 6/1994 | Coleman | 426/134 |
| 5,690,535 | 11/1997 | Coleman et al. | 446/236 |
| 5,957,746 | 9/1999 | Diamond | 446/236 X |
| 5,971,829 | 10/1999 | Hartman | 446/236 |

*Primary Examiner*—John A. Ricci
*Attorney, Agent, or Firm*—Marshall, O'Toole, Gerstein, Murray & Borun

[57] ABSTRACT

The present invention is directed to a candy holding device for holding a piece of candy and causing the piece of candy to be rotated. The candy holding device includes a housing, a drive system disposed within the housing, a rotatable member adapted to support a piece of candy so that rotation of the rotatable member by the drive system causes the piece of candy to rotate, a flexible member composed of an elastically deformable material, and an actuator coupled to the flexible member to cause a portion of the flexible member to move as the rotatable member rotates. The flexible member may be provided in the form of a face having a mouth area, and the actuator may be provided in the form of a connecting rod having a first end shaped in the form of a pair of lips and a second end operatively coupled to the rotatable member. The lips may be coupled to the mouth area so that the lips, the mouth area, and/or the cheeks of the face move in and out in synchronism with rotation of the candy.

20 Claims, 2 Drawing Sheets

A preferred embodiment of the preferred embodiment, which is made with reference to the drawings, a brief description of which is provided below.

SPIN POP WITH FACIAL EXPRESSION CAPABILITY

BACKGROUND OF THE INVENTION

The invention is directed to a candy-holding device, and more particularly to a motorized lollipop holder, or spin pop, that is designed to rotate a lollipop held by the device.

Various types of lollipop holders have been previously designed. For example, U.S. Pat. No. 5,209,692 to Coleman, et al. discloses a battery-operated candy holding device having a motor, a gearing system, and a rotatable shaft which is adapted to be coupled to the stick of a lollipop. Upon depression of a button on the candy-holding device, the motor is activated, which causes the gearing system to spin the rotatable shaft, which in turn causes the lollipop to spin.

U.S. Pat. No. 5,690,535 to Coleman, et al. discloses a candy holding device which is designed to hold two lollipops and rotate the lollipops upon depression of a button. The candy holding device of the Coleman, et al. patent has a pair of rotatable spindles, each of which is adapted to be coupled to a respective one of the two sticks of the lollipops, and a gearing system which simultaneously rotates both of the spindles upon depression of the button.

SUMMARY OF THE INVENTION

The present invention is directed to a candy holding device for holding a piece of candy and causing the piece of candy to be rotated. The candy holding device includes a housing, a drive system disposed within the housing, a rotatable member adapted to support a piece of candy so that rotation of the rotatable member by the drive system causes the piece of candy to rotate, a flexible member composed of an elastically deformable material, and an actuator coupled to the flexible member to cause a portion of the flexible member to move as the rotatable member rotates.

The flexible member may be provided in the form of a face having a mouth area and/or cheeks, and the actuator may be provided in the form of a connecting rod having a first end shaped in the form of a pair of lips and a second end operatively coupled to the rotatable member. The lips may be coupled to the mouth area so that the lips, the mouth area, and/or the cheeks of the face move in and out in synchronism with rotation of the candy. The mouth area of the flexible member may have an aperture formed therein, and the actuator may be disposed through the aperture so that movement of the lips causes movement of the mouth area and/or cheeks of the flexible member.

The rotatable member may be provided in the form of a rotatable shaft having a central axis and an offset portion offset from the central axis, and the actuator may be provided in the form of a connecting rod having a first end operatively coupled to the flexible member and a second end operatively coupled to the offset portion of the rotatable shaft. The candy holding device may also include an actuator button associated with the housing, the actuator button being operatively connected to actuate the motor to cause rotation of the rotatable member.

The candy holding device may be provided with a drive system in the form of a source of battery power disposed within the housing, a motor disposed within the housing and adapted to be powered by the source of battery power, and a gearing system having at least one gear and being operatively coupled to the motor.

The features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
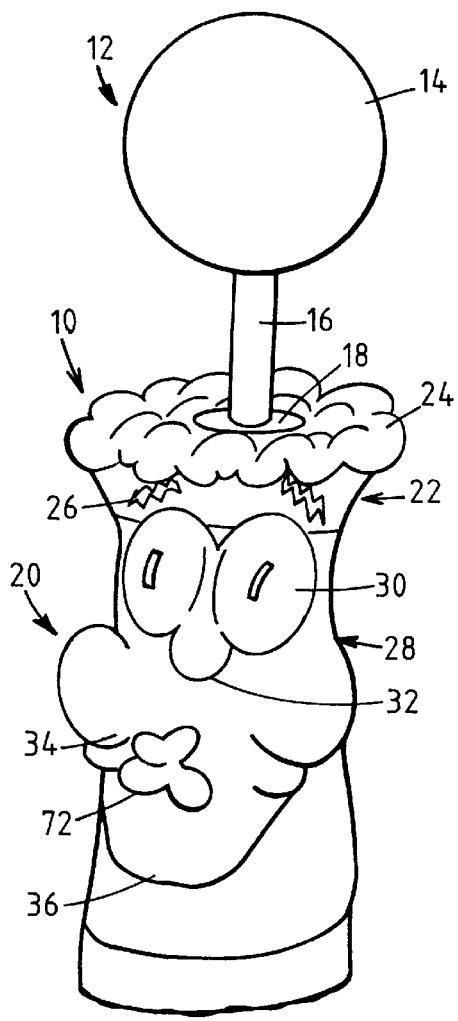
FIG. 1 illustrates a portion of a preferred embodiment of a candy holding device in accordance with the invention.

A preferred embodiment of a candy holding device 10 in accordance with the invention is shown in FIGS. 1–4. Referring to FIG. 1, the candy holding device 10 is adapted to hold a lollipop 12 composed of a piece of candy 14 on a stick 16. The stick 16 passes through an aperture 18 formed in the top of a head-shaped member 20 of the candy holding device 10. The head-shaped member 20 may have a two-piece construction which includes an upper piece 22 (FIG. 4) having a portion 24 shaped to resemble hair and a pair of eyebrows 26.

Figure 4:
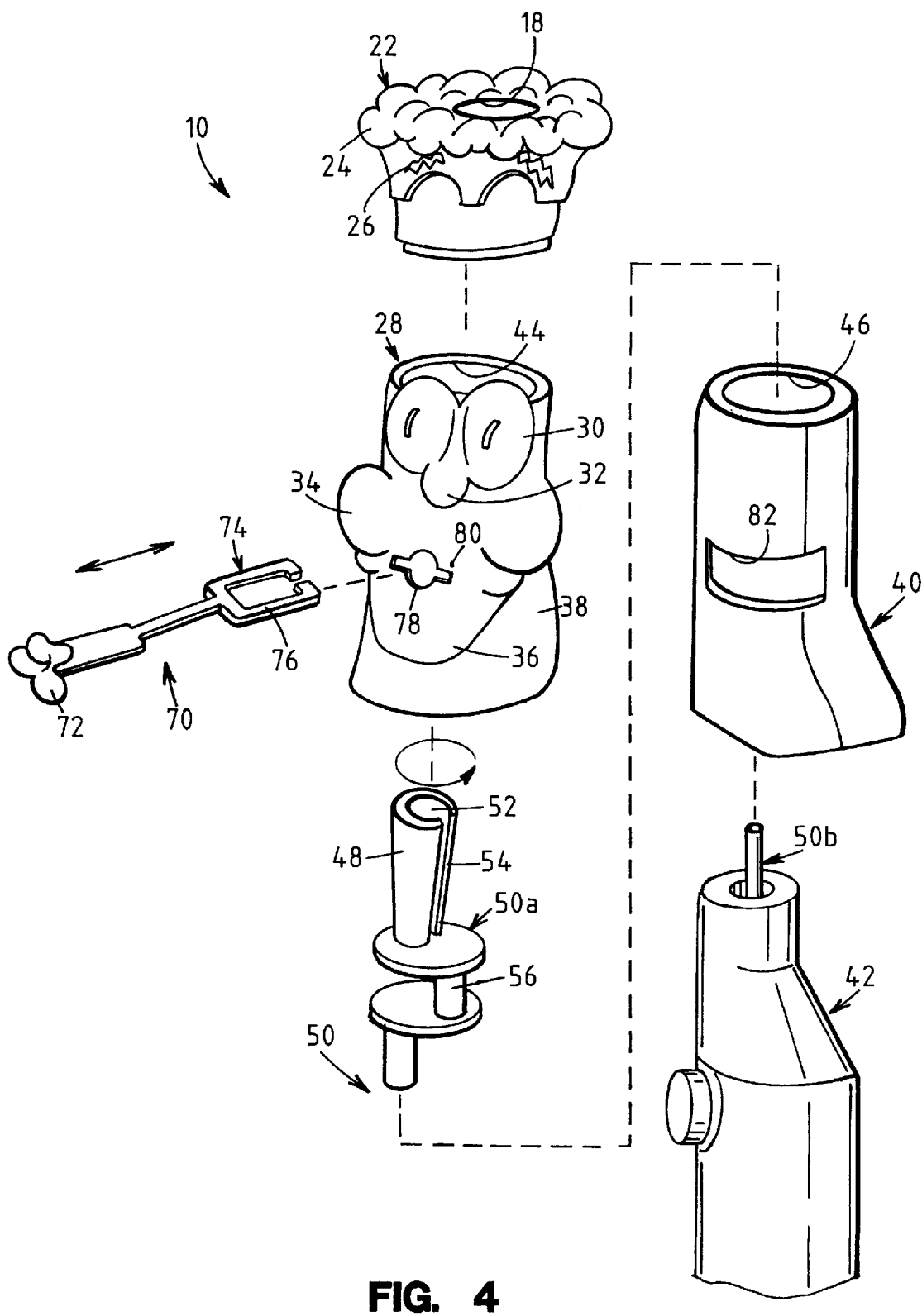
FIG. 4 is an exploded perspective view of a portion of the candy holding device of FIG. 1.

Referring to FIG. 4, the upper piece 22 may be snap-fit, glued, or otherwise connected to a lower, facial member 28 shaped to have a pair of eyes 30, a nose 32, a pair of cheeks 34, a chin 36 and a neck 38. The facial member 28, which may be composed of a flexible material, may be supported by an upper housing portion 40 composed of a more rigid material. The upper housing portion 40 may be connected to a main housing portion 42 in any conventional manner, such as by snap-fitting, gluing, etc. The main housing portion 42 may be provided with a two-piece construction having two separate housing portions that are connected together in a conventional manner.

The facial member 28 has an aperture 44 formed therein, and the upper housing portion 40 has an aperture 46 formed therein, each of the apertures 44, 46 allowing the stick 16 of the lollipop 12 to pass through to be inserted into a holder 48 integrally formed with an upper portion 50a of a rotatable member 50. The holder 48 may have a vertically disposed, cylindrically shaped bore 52 that is sized to receive the stick 16 and hold the stick 16 firmly enough so that rotation of the holder 48 will impart a like rotation to the stick 16 of the lollipop 12. The holder 48 may also have a vertically disposed, elongate slot 54 to allow slight enlargement of the bore 52 upon insertion of the stick 16 of the lollipop 12 so that the stick 16 is held tightly within the bore 52.

The upper portion 50a of the rotatable member 50 may have a vertically disposed, central axis and an offset portion 56, that may be in the form of a cylindrical shaft, that is offset from the central axis. The upper portion 50a may also have a bore (not shown) formed in its bottom which is adapted to receive a lower portion 50b of the rotatable member 50, which may be in the form of a drive shaft.

Referring to FIG. 4, the candy holding device 10 includes an actuator 70, which may be in the form of a connecting rod, having a first end which is shaped in the form of a pair of lips 72 and a second end having a connector 74, which may be in the form of a pair of elastically deformable connecting arms 76.

The facial member 28 has an aperture 78 formed therein adjacent a mouth area 80 of the facial member 28, and the upper housing portion 40 has an aperture 82 formed therein. The aperture 82 is large enough to allow the connector 74 of the actuator 70 to pass through it and to be connected to the offset shaft 56 so that the offset shaft 56 is loosely held between the two connecting arms 76 of the connector 74.

The aperture 78 formed in the facial member 28 may be sized large enough to allow the connector 74 to pass therethrough, but small enough to prevent the lips 72 from passing therethrough. The lips 72 may be integrally formed with the actuator 70, or affixed thereto. During assembly, the lips 72 may be glued to the mouth area 80 of the facial member 28 after the actuator 70 is passed through the bore 78 in the facial member 28 and the bore 82 in the upper housing portion 40.

Figure 3:
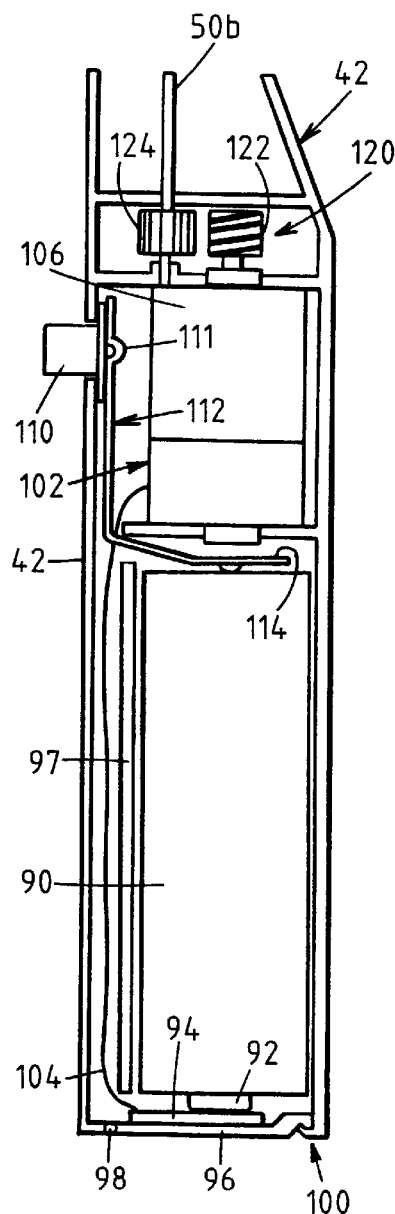
FIG. 3 is an elevational view of the interior of a portion of the candy holding device of FIG. 1.

FIG. 3 illustrates the internal structure of the candy holding device 10. Referring to FIG. 3, the candy holding device 10 has a source of battery power in the form of a battery 90. The battery 90 has an outwardly extending battery terminal 92 that makes conductive and physical contact with a conductive plate 94, such as a metal plate, supported by a hinged door 96 that may be opened to allowing changing of the battery 90. The battery 90 may be retained in a fixed position within the main housing portion 42 via one or more retaining walls 97, which may be integrally formed with the main housing 42.

The door 96 is pivotally connected to the main housing 42 at a hinge 98, which is slidably and pivotally disposed in a pair of slots (not shown). The door 96 may be opened by first pressing upwards on its right-hand side to disengage the door 96 from a latch 100, then sliding the door 96 to the left in FIG. 3, and then pivoting the door 96 downwards. The hinged door 96 is of conventional construction, the particulars of which are not considered important to the invention.

The conductive plate 94 that contacts the battery terminal 92 is connected to a first terminal (not shown) of a motor 102 via an insulated wire 104. The motor 102 has a second terminal in the form of an outer conductive plate 106 formed around the entire periphery of the motor 102. The candy holding device 10 has an actuator button 110 that passes through an aperture in the main housing 42. As shown in FIG. 3, the right-hand side of the actuator button 110 is disposed adjacent an upper portion 111 of a conductive member 112, which may be composed of spring steel. A lower portion 114 of the conductive member 112, which may be disposed perpendicularly to the upper portion 111, makes physical and conductive contact with the upper terminal of the battery 90. The motor 102 may be activated by depressing the actuator button 110, which causes the upper portion 111 of the conductive member 112 to make contact with the second motor terminal 106, thus completing the circuit between the motor 102 and the battery 90.

The motor 102 has a drive shaft 118 that is connected to a gearing system 120 having a worm gear 122 connected to the drive shaft 118, a straight gear 124 disposed on and fixed to the rotatable shaft 50b, a straight gear 126 (FIG. 2) that engages the worm gear 122, and a worm gear 128 (FIG. 2) that engages the straight gear 124, with both the gears 126, 128 being disposed on a single rotatable shaft 130 rotatably supported by the main housing 42.

Figure 2:
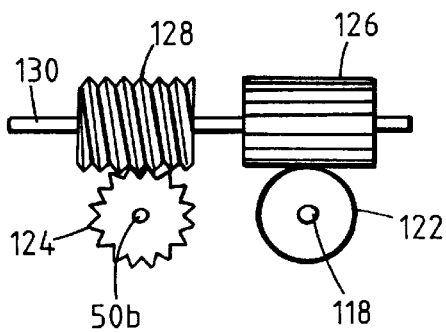
FIG. 2 is a top view of the gearing system incorporated in the candy holding device of FIG. 1.

Referring to FIG. 2, which is a top view of the gearing system 120, when the motor 102 is activated, the drive shaft 118 of the motor 102 rotates, causing the worm gear 122 to rotate at the same speed as the drive shaft 118. The engagement of the worm gear 122 causes the straight gear 126 to rotate at a slower speed of rotation. The rotation of the straight gear 126 causes the shaft 130 and the worm gear 128 to rotate at the same speed since the gears 126, 128 are fixed to the shaft 130 and do not rotate relative to the shaft 130. The engagement of the worm gear 128 with the straight gear 124 causes the straight gear 124, and the rotatable shaft 50b to which it is fixed, to rotate at a slower speed. Since the rotatable shaft 50b is fixed to the stick holder 48 (FIG. 4), the lollipop 12 (FIG. 1) is caused to rotate.

The gearing system described above is conventional, and other gearing systems causing rotation of the lollipop 12 could be used. The drive system in which the gearing system is incorporated, including the motor, the battery, and the manner in which the circuit is completed is also conventional, and other driving systems could be utilized.

The facial member 28 may be composed of a flexible material, such as plastic in the form of polyvinyl chloride (PVC) (40 durometer) for example. Other portions of the candy holding device 10, such as the actuator 70, the housing portion 40, the main housing portion 42, the upper portion 22 of the head 20, may be composed of a plastic material in the form of acrylonitrile-butadiene-styrene (ABS).

Due to the loose connection of the connector 74 of the actuator 70 to the offset shaft 56, the rotation of the rotatable member 50 will cause the actuator 70 to reciprocate back and forth in a linear direction. Where the lips 72 fixed to the end of the actuator 70 are glued or otherwise fixed to the mouth area 80, the reciprocation of the actuator 70 may cause the mouth area 80 and/or the cheeks 34 of the facial portion 28 (composed of flexible material) to move in and out, simulating a facial expression that could be characterized as a "puckering" or "sucking" expression.

Where the lips 72 are not glued to the mouth area 80, the reciprocation of the actuator 70 and the lips 72 may not necessarily cause the mouth area 80 and/or the cheeks 34 to be pushed outwardly in a periodic fashion. However, due to the lips 72 being larger than the aperture 78 formed in the facial member 28, thus preventing them from passing through the aperture 78, the actuator 70 may cause the mouth area 80 to be periodically drawn inwardly as the actuator 70 reciprocates.

Additional features and modifications of the above embodiments, such as those disclosed in U.S. Pat. Nos. 5,209,692 and 5,690,535, which are incorporated herein by reference in their entirety, could be added or made.

Additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A candy holding device for holding a piece of candy attached to a stick, said candy holding device comprising:

a housing;

a source of battery power disposed within said housing;

a motor disposed within said housing and adapted to be powered by said source of battery power;

a gearing system having at least one gear and coupled to be driven by said motor;

a rotatable member coupled to said gearing system and being adapted to support a piece of candy, said rotatable member being rotated by said gearing system upon actuation of said motor;

a flexible member in the form of a face and having a mouth area; and an actuator coupled to said flexible member, said actuator causing said mouth area of said flexible member to move at a frequency in response to rotation of said rotatable member to simulate a facial expression.

2. A candy holding device as defined in claim 1 wherein said actuator comprises a connecting rod having a first end operatively coupled to said flexible member in an area adjacent said mouth area and a second end operatively coupled to said rotatable member.

3. A candy holding device as defined in claim 1 wherein said actuator comprises a connecting rod having a first end shaped in the form of a pair of lips and operatively coupled to said flexible member in an area adjacent said mouth area and a second end operatively coupled to said rotatable member.

4. A candy holding device as defined in claim 3 wherein said mouth area of said flexible member has an aperture formed therein and wherein said actuator is disposed through said aperture so that movement of said lips causes movement of said mouth area of said flexible member.

5. A candy holding device as defined in claim 1 wherein said rotatable member comprises a rotatable shaft having a central axis, wherein said rotatable shaft has an offset portion that is offset from said central axis, and wherein said actuator comprises a connecting rod having a first end operatively coupled to said flexible member in an area adjacent said mouth area and a second end operatively coupled to said offset portion of said rotatable shaft.

6. A candy holding device as defined in claim 1 additionally comprising an actuator button associated with said housing, said actuator button being operatively connected to actuate said motor to cause rotation of said rotatable member.

7. A candy holding device for holding a piece of candy, said candy holding device comprising:

a housing;

a source of battery power disposed within said housing;

a motor disposed within said housing and adapted to be powered by said source of battery power;

a gearing system having at least one gear and coupled to be driven by said motor;

a rotatable member coupled to said gearing system and being adapted to support a piece of candy, said rotatable member being rotated by said gearing system upon actuation of said motor;

a flexible member in the form of a face and having a cheek area; and an actuator coupled to said flexible member, said actuator causing said cheek area of said flexible member to move as said rotatable member rotates to simulate a facial expression.

8. A candy holding device as defined in claim 7 wherein said actuator comprises a connecting rod having a first end operatively coupled to said flexible member adjacent a mouth area and a second end operatively coupled to said rotatable member.

9. A candy holding device as defined in claim 7 wherein said actuator comprises a connecting rod having a first end shaped in the form of a pair of lips and operatively coupled to said flexible member adjacent a mouth area and a second end operatively coupled to said rotatable member.

10. A candy holding device as defined in claim 9 wherein said mouth area of said flexible member has an aperture formed therein and wherein said actuator is disposed through said aperture so that movement of said lips causes movement of said cheek area of said flexible member.

11. A candy holding device as defined in claim 7 wherein said rotatable member comprises a rotatable shaft having a central axis, wherein said rotatable shaft has an offset portion that is offset from said central axis, and wherein said actuator comprises a connecting rod having a first end operatively coupled to said flexible member in an area adjacent a mouth area and a second end operatively coupled to said offset portion of said rotatable shaft.

12. A candy holding device as defined in claim 7 additionally comprising an actuator button associated with said housing, said actuator button being operatively connected to actuate said motor to cause rotation of said rotatable member.

13. A candy holding device for holding a piece of candy and causing said piece of candy to be rotated, said candy holding device comprising:

a housing;

a drive system disposed within said housing;

a rotatable member coupled to said drive system and being adapted to support a piece of candy, said rotatable member being rotated by said drive system so that rotation of said rotatable member causes said piece of candy to rotate;

a flexible member composed of an elastically deformable material; and an actuator coupled to said flexible member, said actuator causing a portion of said flexible member to move as said rotatable member rotates.

14. A candy holding device as defined in claim 13 wherein said flexible member is in the form of a face having a mouth area and wherein said actuator comprises a connecting rod having a first end operatively coupled to said flexible member adjacent said mouth area and a second end operatively coupled to said rotatable member.

15. A candy holding device as defined in claim 13 wherein said flexible member is in the form of a face having a mouth area and wherein said actuator comprises a connecting rod having a first end shaped in the form of a pair of lips and operatively coupled to said flexible member adjacent said mouth area and a second end operatively coupled to said rotatable member.

16. A candy holding device as defined in claim 15 wherein said mouth area of said flexible member has an aperture formed therein and wherein said actuator is disposed through said aperture so that movement of said lips causes movement of said mouth area of said flexible member.

17. A candy holding device as defined in claim 13 wherein said rotatable member comprises a rotatable shaft having a central axis, wherein said rotatable shaft has an offset portion that is offset from said central axis, and wherein said actuator comprises a connecting rod having a first end operatively coupled to said flexible member and a second end operatively coupled to said offset portion of said rotatable shaft.

18. A candy holding device as defined in claim 13 wherein said drive system comprises a motor, said candy holding device additionally comprising an actuator button associated with said housing, said actuator button being operatively connected to actuate said motor to cause rotation of said rotatable member.

19. A candy holding device as defined in claim 13 wherein said drive system comprises:

a source of battery power disposed within said housing;

a motor disposed within said housing and adapted to be powered by said source of battery power; and a gearing system having at least one gear and being operatively coupled to said motor.

20. A candy holding device for holding a piece of candy and causing said piece of candy to be rotated, said candy holding device comprising:

a housing;

a drive system disposed within said housing;

a rotatable member coupled to said drive system and being adapted to support a piece of candy, said rotatable member being rotated by said drive system so that rotation of said rotatable member causes said piece of candy to rotate;

a facial member resembling a face; and an actuator associated with said facial member and coupled to said drive system, said actuator causing a pair of lips associated with said facial member to move as said rotatable member rotates.

* * * * *